United States Patent [19]
Gregory

[11] 3,813,204
[45] May 28, 1974

[54] LIP ADJUSTMENT FOR EXTRUSION DIE
[75] Inventor: Robert B. Gregory, Flemington, N.J.
[73] Assignee: G.K. Systems, Inc., Flemington, N.J.
[22] Filed: Feb. 28, 1973
[21] Appl. No.: 336,422

[52] U.S. Cl................. 425/466, 425/131, 425/461
[51] Int. Cl............................................. B29f 3/00
[58] Field of Search ............ 72/253, 468, 481, 482; 76/90; 425/466, 461, 376, 131

[56] References Cited
UNITED STATES PATENTS

| 2,387,718 | 10/1945 | Coleman | 425/466 |
| 3,096,543 | 7/1963 | Konopacke et al. | 425/466 |
| 3,102,302 | 9/1963 | Moore | 425/466 |
| 3,349,435 | 10/1967 | Bosch | 425/466 |
| 3,349,436 | 10/1967 | Bosch | 425/466 |
| 3,694,119 | 9/1972 | Scheibling | 425/131 |
| 3,748,079 | 7/1973 | Moreno et al. | 425/466 |
| 3,761,211 | 9/1973 | Parkinson | 425/131 |

Primary Examiner—Charles W. Lanham
Assistant Examiner—James R. Duzan
Attorney, Agent, or Firm—Thomas E. Tate

[57] ABSTRACT

This invention is directed to an extrusion die having an adjustable lip provided across its outer face with a slot of generally J-shaped cross-section with an inner wall normal to the plane of extrusion and a planar angularly disposed outer wall. A rod of circular cross-section fits freely within the slot and rests against the inner and outer slot walls. Cap screws threadably carried by the inner supporting portion of the adjustable lip are provided to selectively apply point loading to the rod which in turn applies corresponding linear loading to the adjustable lip.

5 Claims, 4 Drawing Figures

LIP ADJUSTMENT FOR EXTRUSION DIE

THE INVENTION

This invention relates generally to new and useful improvements in that type of linear extrusion die that includes two lips that are closely spaced to define a slot at the zone of extrusion with one of the lips being relatively flexible and adjustable with respect to the other thereof, and particularly seeks to provide a novel means for more accurately setting the adjustment of the adjustable lip that heretofore possible.

In prior known dies it has been customary to provide for adjustability of the adjustable —lip— by fabricating same in such a manner as to provide a generally V-cross-sectioned slot across the full width of the exposed face to define a relatively thin flexible web between the tip of the lip and its inner rigid supporting structure. That face of the V-slot that is outermost generally is a 45° plane adapted to be contacted by a plurality of spaced adjusting cap screws threadably engaged with and extending through the rigid inner supporting structure of the lip along axes that lie in a plane normal to the opposed face of the V-slot in order to apply spaced points of pressure thereagainst to adjust the relative deflection of the lip and the spacing between it and the fixed lip.

In such arrangements the axes of the cap screws must always be substantially normal to the slot face being acted upon, which imposes a limitation upon the positioning and angularity of the cap screws. Furthermore, since the cap screws must be spaced they can impose only spaced point loading on the slot face rather than the more desirable linear loading, which not only would spread the load more uniformly but would also permit the use of smaller diameter cap screws which in turn could use finer threads for finer adjustments.

The lip adjustment means constructed in accordance with this invention overcomes such problems.

Therefore, an object of this invention is to provide an extrusion die having an adjustable lip in which the forces or loads required to adjust same are linearly applied thereto.

Another object of this invention is to provide an extrusion die of the character stated in which the exposed face of the adjustable lip includes a full width slot of generally J-shaped cross-section having an inner wall generally normal to the plane of extrusion and an outer wall including a planar portion disposed at a marked angle with respect to the plane of extrusion, and adapted to receive and retain a load transmitting rod of cylindrical cross-section for linear contact with the walls of the J-slot and point contact by a plurality of adjusting cap screws.

Another object of this invention is to provide an extrusion die of the character stated in which the axes and positionings of the adjusting cap screws may be varied within relatively wide limits while still permitting them to effect any desired load or slot width adjustments to be made to the adjustable die lip.

A further object of this invention is to provide an extrusion die of the character stated in which smaller diameter more finely threaded, or even differentially threaded, cap screws may be used to effect and maintain particularly minute adjustments to any desired portions of the adjustable lip.

A further object of this invention is to provide an extrusion die of the character stated that is simple in design, rugged in construction and economical to manufacture.

With these and other objects, the nature of which will become apparent, the invention will be more fully understood by reference to the drawings, the accompanying detailed description and the appended claims.

Figure 2:
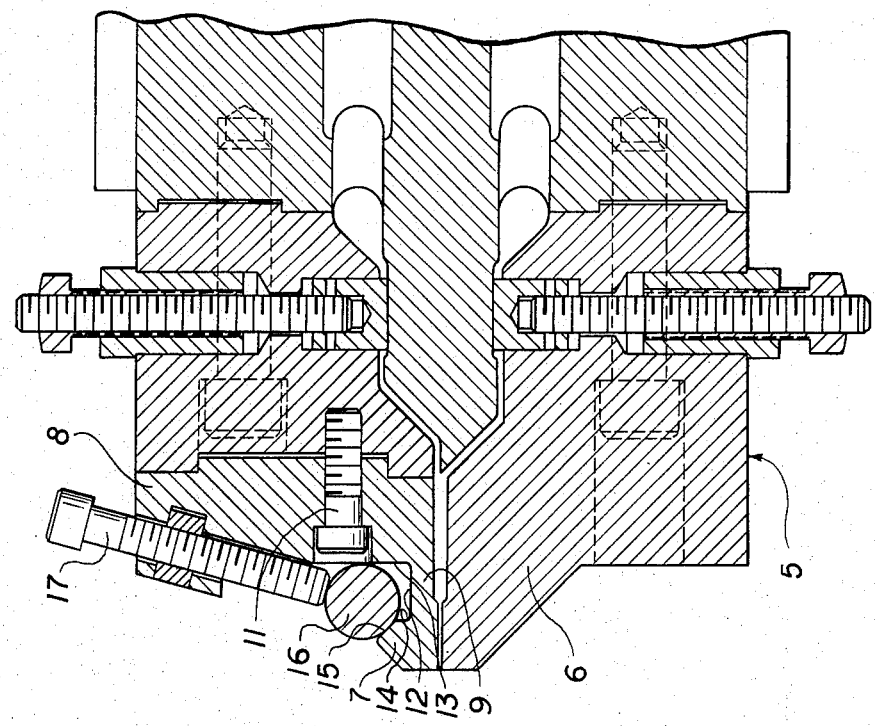
FIG. 2 is a vertical transverse section thereof taken along line 2—2 of FIG. 1.

Referring to the drawings in detail the invention, as illustrated, is embodied in a laterally extending extrusion die generally indicated 5 having a rigid lip 6 and an opposite lip 7 that is relatively flexibly connected to its inner supporting structure 8 by a web 9 which is thin enough to flex through a relatively narrow angular range while still being thick enough to provide adequate structural support for the lip 7.

The rigid lip 6 is affixed to a supporting element as by recessed bolts 10 and the inner supporting structure 8 of the lip 7 is similarly attached as by recessed bolts 11.

The web 9 forms the bottom of a transverse slot 12 of a generally J-shaped cross-section having an inner wall 13 disposed generally normal to the plane of extrusion between the lips 6 and 7 and a lower outer wall 14 generally parallel to the inner wall 13 which terminates in an upwardly and outwardly directed angularly disposed wall portion 15.

A rod 16, of circular cross-section, is freely mounted within the slot 12 and is of a diameter such as to rest upon and be in linear contact with both the wall 13 and the angular wall portion 15 thereof so that when a force or load is applied to any exposed outer surface of the rod it will be transmitted in two components, one of which will act linearly against the wall 13 and the other of which will act linearly against the wall portion 15 to change the deflection of the adjustable lip 7. Although for the purposes of illustration the wall portion 15 is shown to be at an angle of 45°, such angle may be varied within the range of 10°–80° depending on the position and angularity of the adjusting cap screws and for the desired direction of the load component to be applied to the lip 7 through the wall portion 15. The proper selection of angles for the wall portion 15 will produce a mechanical reduction of motion so that the motion of the lip is less than that of the adjusting cap screws, thus allowing the lip to be more finely adjusted than is possible by direct acting adjusting screws. Furthermore, use of the rod 16 significantly increases the section modulus of the deflecting portion of the lip, thus allowing the adjustment to be more proportional to the total deflection of the bar and less dependent upon the screw to screw adjustment.

The use of the rod 16 not only provides linear load imposing contact with the associated walls of the J-slot 12 but also permits the adjusting cap screws to be positioned at any desired position or angle so long as the inner ends thereof can contact any outer exposed portion of the rod 16. As mentioned above, this is in marked contrast with prior known lip adjusting devices in which the axes of the adjusting screws had to lie in a plane substantially normal to the contacted face or wall of a V-slot.

Figure 1:
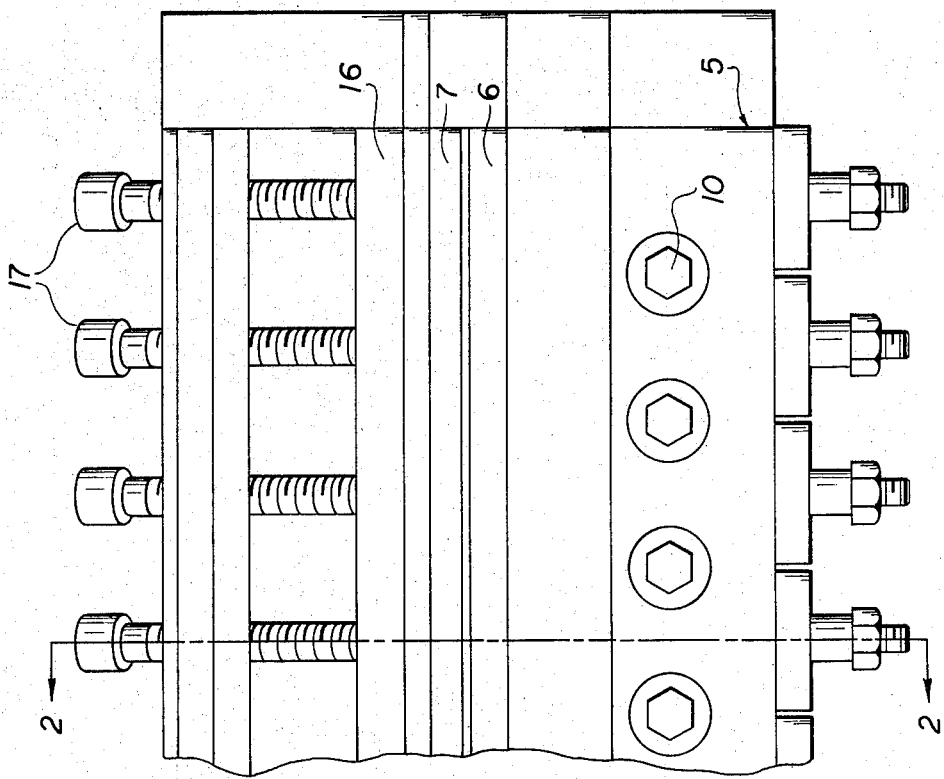
FIG. 1 is a fragmentary front elevation of the lip portion of an extrusion die constructed in accordance with this invention.

For example and as shown in FIGS. 1 and 2, a plurality of spaced parallel cap screws 17 are threadeably mounted on the upper part of the inner supporting structure 8 with their axes lying in a plane that is only slightly angled from the plane that is normal to the plane of extrusion that contains the slot defined by the lips 6 and 7, and with their inner ends in contact with the rod 16. In this manner the point or near point loading imposed on the rod 16 by the cap screws 17 is translated into continuous linear loading having one component imposed on the wall portion 15 and another component imposed on the wall 13.

Figure 3:
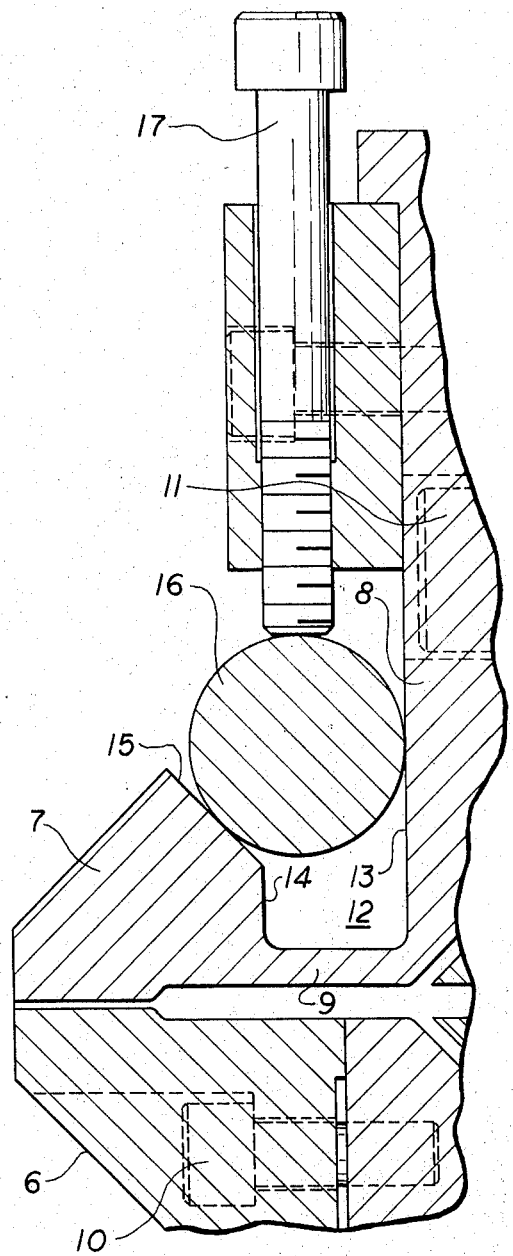
FIG. 3 is a view similar to FIG. 2 but showing a modification in which the adjusting cap screws are normal to the plane of extrusion.

FIG. 3 shows a similar arrangement but with the cap screws 17 having their axes lying in a plane normal to the plane of extrusion.

Figure 4:
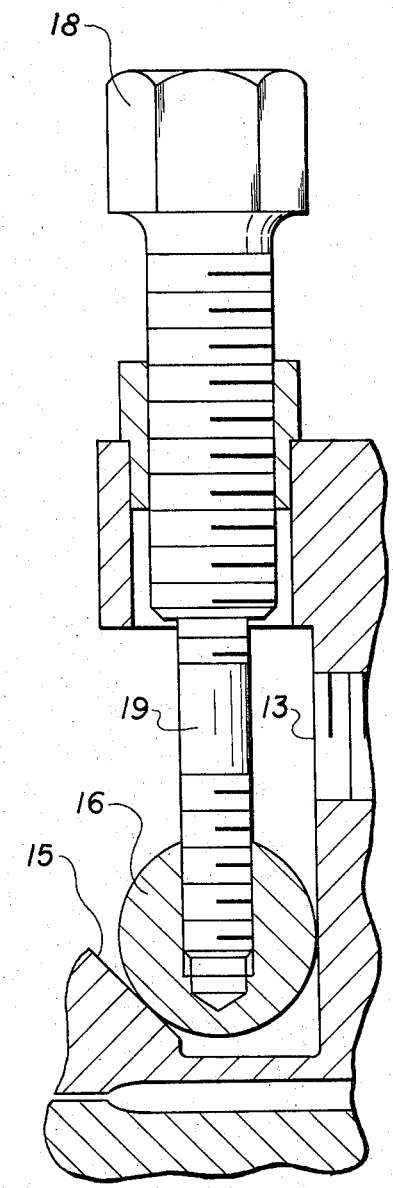
FIG. 4 is a view similar to FIG. 3 but showing the use differentially threaded cap screws.

FIG. 4 shows an arrangement similar to FIG. 3 but having the cap screws 17 replaced by differentially threaded cap screws 18, each of which has its inner smaller diameter end 19 threadably engaged into the rod 16 in order to provide a finer degree of adjustment than is possible with the single threaded cap screws 17.

Although it is believed that the reasons for needing adjustable lips in extrusion dies of these types are well known, a brief review thereof will be included so that reference to a separate descriptive source need not be made.

Ideally, if an extrudable hot melted plastic has an absolutely uniform viscosity and temperature throughout its mass at the zone of extrusion the lip slot of the extruder die can be of uniform width throughout its length for any selected combined flow rate and draw down and need be changed only to adapt to a different combined flow rate and draw down. Unfortunately this ideal condition of the extrudate can only be approximated, thus requiring localized adjustments of the slot width in order to compensate for corresponding localized variations in the flow characteristics of the extrudate and such localized adjustments may render the associated portions of the slot either wider or narrower than nominal or mean setting required for the specific combined flow rate and draw down involved. Such localized adjustments generally are quite small in amount and must be precisely made in order to avoid overcorrection or to avoid throwing an adjacent slot area out of its proper flow rate adjustment.

Point loading of the adjustable lip as heretofore practiced by separate cap screws directly engaging the lip is not completely effective because undesirable minute deflections of the lip can occur between load application points. Such possible undesirable deflections are eliminated through the device of this invention since the applied loading is linear and is spread along a measurable distance to each side of the axis of each adjusting cap screw.

It also should be noted that through the use of this invention it is possible to significantly reduce the diameter of the cap screws, and thus use finer pitch threads for finer lip adjustments, since the force required to resist lip motion due to plastic pressure is directed in two components, one of which is borne by the cap screws and the other of which is borne by the wall 13 of the J-slot. Each component obviously is less than the total force so that the cap screws need only resist the component that is applied to them, rather than the total force as has been the case with prior known devices.

It is of course to be understood that variations in arrangements and proportions of parts may be made within the scope of the appended claims.

I claim:

1. In a laterally extending extrusion die having a straight adjustable lip, said adjustable lip being located to one side of the plane of extrusion and being provided across its outer face with a slot of generally J-shaped cross-section and having an inner wall and an outer wall spaced from and parallel to said inner wall and including an outwardly diverging planar portion, said inner and outer walls being connected by a web forming the bottom of said J-shaped slot, a rod of circular cross-section freely mounted within said slot and having a length comparable to that of said slot and a diameter sufficiently great as to rest against and be supported by said inner wall and the diverging planar portion of the said outer wall of said slot, said adjustable lip also being provided with an inner supporting structure, and means carried by said inner supporting structure for selectively and adjustably applying spaced point loadings to said rod and thereby corresponding linear loadings to the said diverging planar portion of said slot outer wall to effect adjustment of the corresponding portions of said adjustable lip.

2. The extrusion die of claim 1 in which said load applying means comprise a plurality of spaced parallel cap screws with their axes lying in a single plane and having their inner ends engaged against said rod.

3. The extrusion die of claim 2 in which the said outwardly diverging planar portion of said outer wall is disposed at an angle from 10°–80° with respect to the plane of extrusion of said die.

4. The extrusion die of claim 3 in which the angle of said outwardly diverging planar portion is 45°.

5. The extrusion die of claim 3 in which the geometry of the rod-contacted walls of said J-slot and said rod and said cap screws together is such as to effect a mechanical reduction in movements of the adjustable lip as compared to the corresponding axial movements of the said cap screws.

* * * * *